(12) United States Patent
Kortes

(10) Patent No.: US 8,652,548 B2
(45) Date of Patent: Feb. 18, 2014

(54) FISH FLAVOUR

(75) Inventor: Jan Gerrit Kortes, Leusden (NL)

(73) Assignee: DSM IP Assests B.V., Heerlen (NL)

( * ) Notice: Subject to any disclaimer, the term of this patent is extended or adjusted under 35 U.S.C. 154(b) by 36 days.

(21) Appl. No.: 13/124,928

(22) PCT Filed: Oct. 16, 2009

(86) PCT No.: PCT/EP2009/063551
§ 371 (c)(1),
(2), (4) Date: Apr. 19, 2011

(87) PCT Pub. No.: WO2010/046313
PCT Pub. Date: Apr. 29, 2010

(65) Prior Publication Data
US 2011/0200707 A1  Aug. 18, 2011

(30) Foreign Application Priority Data
Oct. 20, 2008  (EP) .................................. 08166995

(51) Int. Cl.
*A23L 1/226*  (2006.01)

(52) U.S. Cl.
USPC ............................ 426/33; 426/442; 426/650

(58) Field of Classification Search
USPC .......................................... 426/33, 442, 650
See application file for complete search history.

(56) References Cited

U.S. PATENT DOCUMENTS

| | | | |
|---|---|---|---|
| 4,604,290 A | 8/1986 | Lee et al. | |
| 5,178,892 A | 1/1993 | Simmons et al. | |
| 5,271,949 A * | 12/1993 | Haring et al. | 426/317 |
| 5,958,755 A | 9/1999 | Skelton et al. | |
| 6,482,433 B1 * | 11/2002 | DeRoos et al. | 424/464 |
| 2008/0317904 A1 * | 12/2008 | Kortes et al. | 426/60 |

FOREIGN PATENT DOCUMENTS

| | | | |
|---|---|---|---|
| DE | 3235966 | | 3/1984 |
| EP | 0 136 928 | * | 4/1985 |
| EP | 1902626 | | 3/2008 |
| JP | 59039266 | | 3/1984 |

OTHER PUBLICATIONS

International Search Report of PCT/EP2009/063551 dated Jan. 28, 2010 (3 pages).
Database EPODOC; European Patent Office; The Hague, NL; Oct. 10, 2007; XP002527369 abstract & CN 1904011; Shanghai College of Applied TE.
Database WPI Week 200823; Thomas Scientific; London, GB; AN 2008-D16810; XP002562997 & CN 101050431; University Zhejiang Technology.
Scherz H. and Senser F. (Editors): "Souci Fachmann Kraut, food compositions and Nutrition Tables," 2000, pp. 434-435; XP002562998.

* cited by examiner

*Primary Examiner* — D. Lawrence Tarazano
*Assistant Examiner* — Hamid R Badr
(74) *Attorney, Agent, or Firm* — Miles & Stockbridge, P.C.

(57) ABSTRACT

A process for producing a product having a fish flavor is provided, the process comprising preparing a composition comprising 1-20% w/w water and at least a polyunsaturated fatty acid, incubating the composition at less than 260° C. and at a reaction time sufficient for the fish flavor to develop, and optionally mixing the product with one or more other ingredients. The product obtainable by this process and methods for using the same are also provided.

19 Claims, No Drawings

FISH FLAVOUR

CROSS REFERENCE TO RELATED APPLICATIONS

This application is a §371 National Stage Application of PCT/EP2009/063551 filed Oct. 16, 2009, which claims priority to EP Application 08166995.4 filed Oct. 20, 2008.

FIELD OF THE INVENTION

This invention relates to a process for producing a product having a fish flavour.

BACKGROUND OF THE INVENTION

Fish flavours are used as food additives to alter or enhance the flavours of a natural food product such as fish and fish products, or to create fish flavour to foods which lack a natural fish flavour such as snacks.

The flavour of cooked fish meat and cooked meat of other aquatic animals is the result of a complex mixture of aldehydes and browning products. The aldehydes are formed through degradation of polyunsaturated fatty acids, for example docosahexaenoic acid (Shahidi, F. *Flavor of Meat, Meat Products and Seafoods* (2nd Edition). Springer-Verlag).

Commercial fish flavours are produced by processing whole fish, in particular so-called white fish. A disadvantage of this production process is that there is little or no possibility to tune the process conditions such that any specific fish flavour can be made. As a consequence, these types of fish flavours have a generic fish flavour and do not provide the customer the possibility to select any specific flavour.

Another possibility to bring fish flavour to food products is by adding so-called top notes. These are chemicals which naturally occur in fish but which, unlike the abovementioned fish flavours, are not derived from fish, but are produced synthetically. A disadvantage of top notes is that they only provide part of the fish flavour, namely the smell or scent, but not the taste, and therefore lack the full-bodied, characteristic fish flavour of the real fish or fish product. Another disadvantage is that they are not natural and are often avoided by the consumer for being artificial and not natural.

A disadvantage of many of the fish derived fish flavours is that these are not kosher and/or halal which severely limits their application in the food industry. It is an object of the present invention to obviate the disadvantages of the current fish flavours and to provide a novel process for the production of a range of different fish flavours.

DESCRIPTION OF THE INVENTION

In a first aspect the invention provides a process for producing a product having a fish flavour, the process comprising
  a) preparing a composition comprising 1-20% w/w water and at least a polyunsaturated fatty acid,
  b) incubating the composition at less than 260° C. and at a reaction time sufficient for the fish flavour to develop,
  c) optionally mixing the product with one or more other ingredients.

Flavour is defined as the sensory impression of a food or other substance, and is determined by the chemical senses of taste and smell.

In the context of this invention "fish flavour" is defined as the flavour of food derived from any edible aquatic freshwater or sea animal. Likewise, in the context of this invention "fish" is defined as any edible aquatic freshwater or sea animal. Examples of fish are bony fish such as shad, sole, anchovy, cod, eel, carp, mackerel, bonito, herring, salmon, trout, barramundi, halibut, catfish, flounder, bream, haddock, shark, bass, marlin, mullet, pike, perch, pikeperch, pilchard, pufferfish, sardine, tuna, snook, swordfish, skate, tilapia, and turbot, cartilaginous fish such as sharks and rays, whales and seals, aquatic crustaceans such as for example shrimp, crayfish, crab, lobsters, prawns, and langostinos, and aquatic molluscs such as for example shellfish, oysters, mussels, scallops, clams, cockles, barnacles, squid, octopus, and cuttlefish.

With the process of the first aspect of the invention different fish flavours may be produced. The fish flavour may be a flavour of fresh fish or of processed fish. With fresh fish is meant that the fish or fish-derived product giving off the flavour has not been processed, in other words that it is raw. With processed fish is meant that the fish or fish-derived product is treated in some way. Examples of processing are cooking, boiling, grilling, roasting, frying, and smoking. Other examples of processing are fermentation, as is for example done with herring and salmon, and drying (to make stockfish). Therefore, the fish flavour may be a cooked or boiled flavour, or a grilled, roasted, fried, and/or smoked flavour or a mixture of thereof.

The fish flavour produced with the process of the invention is preferably suitable to enhance or impart a desired fish flavour to a food or feed product, for example to impart a fish flavour which the food of feed product is lacking, or to enhance an existing fish flavour of a food or feed product. The fish flavour produced with the process of the invention is highly concentrated, i.e. it is very strong, such that adding small amounts of the fish flavour to food or feed may already be sufficient to provide a desired fish flavour. Because it is so concentrated the fish flavour produced with the process of the invention is preferably not suitable for consumption undiluted. Based on the application, the fish flavour produced with the process of the invention is preferably added to food or feed in an amount to arrive at a concentration between 0.01% and 5% w/w, preferably between 0.05 and 1% w/w, more preferably between 0.1 and 0.5% w/w based on the total weight of the food or feed.

In the process of the first aspect the composition preferably may have no fish flavour prior to incubating said composition under conditions of temperature and reaction time sufficient for the fish flavour to develop. In this way, any unwanted fish flavour may be prevented until after producing the fish flavour according to the process of the first aspect. This is advantageous for example during storage of the composition before being used to produce the fish flavour.

Polyunsaturated fatty acids are fatty acids with more than one unsaturated C—C bond. The polyunsaturated fatty acid in step (a) of the process of the first aspect of the invention may be in the form of the free acid or a salt thereof. The polyunsaturated fatty acid may also be esterified, for instance to a glycerol moiety, as for example as a mono-, di-, or triglyceride. The polyunsaturated fatty acid may be in liquid form or in solid form. When in solid form, the polyunsaturated fatty acid may be in the form of a powder, as for example a spray-dried formulation, or as a granulate. The polyunsaturated fatty acid may be in pure form or it may comprise other ingredients such as salts and/or carbohydrates such as starch, dextrine, and maltodextrin.

In a preferred embodiment the polyunsaturated fatty acid is an omega-3 polyunsaturated fatty acid. Omega-3 polyunsaturated fatty acids (also denoted as "n-3" or "ω-3" fatty acids) are polyunsaturated fatty acids wherein the first double bond in the polyunsaturated fatty acid chain is positioned at the third C—C bond, starting from the carbon atom farthest away from the carboxyl moiety. Omega-3 polyunsaturated fatty acids are abundant in fish and in fish-derived products such as fish oil. Omega-3 polyunsaturated fatty acids include alpha-linolenic acid, stearidonic acid, eicosatrienoic acid, eicosatetraenoic acid, eicosapentaenoic acid, docosapentaenoic acid, docosahexaenoic acid, tetracosapentaenoic acid, and tetracosahexaenoic acid. Omega-3 fatty acids can be advantageously used to produce desirable fish flavours in the process of the first aspect of the invention.

In a more preferred embodiment the omega-3 fatty acid is eicosapentaenoic acid and/or docosahexaenoic acid. The eicosapentaenoic acid and/or docosahexaenoic acid may be derived from non-animal sources such as from *Spirulina* or microalgae such as *Crypthecodinium* (e.g. *Crypthecodinium cohnii*) and *Schizochytrium*, from fish, preferably oily fish such as pilchard, cod, herring, halibut, shark, and anchovy, from fish products such as for example fish organs (such as liver) and fish oil, and from zooplankton such as krill and shrimp. The eicosapentaenoic acid and/or docosahexaenoic acid may be derived from fish oil. Fish oils are rich in eicosapentaenoic acid and/or docosahexaenoic acid. The fish oil may be either crude fish oil or refined fish oil. The fish oil may be in liquid or solid form. When in solid form, the fish oil may be in the form of, for example, powder, granules, tablets, or beadlets, and may be optionally coated, for example with a wax, emulsion, gelatin, polyethylene glycol, starch, and/or carbohydrate. The fish oil may comprise additional ingredients, for example stabilisers such as sodium ascorbate and tocopherols. The fish oil may contain between 0% and 100% docosahexaenoic and/or eicosapentaenoic acid.

The amount of the polyunsaturated fatty acid in the composition of the process of the first aspect may be between 0.1% w/w and 100% w/w based on the total weight of the composition. Preferably, in order to obtain a desirable fish flavour, the amount is between 0.2% w/w and 10% w/w, more preferably between 0.3% and 1% w/w based on the total weight of the composition.

The temperature of the composition in step (b) of the process of the invention is preferably less than 240° C., more preferably less than 220° C., even more preferably less than 200° C. The temperature of the composition in step (b) of the process of the invention is preferably more than 60° C., preferably more than 80° C., more preferably more than 100° C. Preferably the temperature is between 100° C. and 200° C., more preferably between 110° C. and 180° C., even more preferably between 120° C. and 160° C. When the incubation temperature is too high (e.g. >260° C.) the product may have burnt off notes. When the incubation temperature is below 100° C., e.g. below 60° C. the incubation may proceed very slowly or not at all, resulting in no or insufficient formation of fish flavour. Generally, lower incubation temperatures (e.g. less than 100° C.) may result in desirable cooked and/or boiled fish flavours, whereas more elevated incubation temperatures (e.g. more than 100° C.) may result in desirable roast, grilled, or fried fish flavours.

The water content of the composition in step (b) of the process of the first aspect of the invention is preferably between 1% and 15%, more preferably between 1% and 10% w/w based on the total weight of the composition, even more preferably between 1 and 9%, 1 and 8%, 1 and 7%, 1 and 6%, most preferably between 1 and 5% w/w based on the total weight of the composition. A low water content of the composition (i.e. less than 20% w/w) may result in a higher incubation temperature during step (b) of the process, for instance a temperature above 100° C. Higher temperatures may result in shorter reaction times, which in turn may be cost-efficient. A low water content of the composition in step (b) of the process of the invention (e.g. less than 20% w/w based on the total weight of the composition) may make it possible to tune the process conditions, particularly to vary the incubation temperatures, such that a range of fish flavours may be produced, for example cooked or boiled fish flavours at lower incubation temperatures (e.g. less than 100° C.) and roast, grilled, or fried fish flavours at higher temperatures (e.g. more than 100° C.). When the water content of the composition is too high, e.g. more than 20% w/w based on the total weight of the composition, the desired fish flavour may not develop and/or undesired off-notes may develop. When the water content is too low, e.g. less than 1%, the composition may burn and as a result undesired burnt off-notes may result.

The skilled person will understand that the incubation time in step (b) of the process of the first aspect of the invention depends on the incubation temperature as well as on the water content and on the desired fish flavour. At higher incubation temperatures the incubation time may be shorter in order to obtain the fish flavour, whereas at lower incubation temperatures the incubation time may be longer in order to obtain the desired fish flavour. Likewise, at lower water content the incubation time may be shorter, whereas at higher water content the incubation time may be longer. The skilled person may therefore, without undue burden, establish suitable conditions with respect to temperature, time and water content in order to obtain the desired fish flavour.

In a preferred embodiment, the composition used in the process of the present invention may comprise a yeast extract and/or yeast autolysate. The Food Chemical Codex defines a "yeast extract" as follows: "Yeast Extract comprises the water soluble components of the yeast cell, the composition of which is primarily amino-acids, peptides, carbohydrates and salts. Yeast extract is produced through the hydrolysis of peptide bonds by the naturally occurring enzymes present in edible yeast or by the addition of food-grade enzymes". The Food Chemical Codex defines "autolysed yeast" as "the concentrated, nonextracted, partially soluble digest obtained from food-grade yeast. Solubilization is accomplished by enzyme hydrolysis or autolysis of yeast cells. Food-grade salts and enzymes may be added. Yeast, autolyzed, contains both soluble and insoluble components derived from the whole yeast cell. It is composed primarily of amino acids, peptides, carbohydrates, fats, and salts". The yeast extract or yeast autolysate may be produced from any type of food-grade yeast, for example baker's yeast, beer yeast or wine yeast. Preferably, the yeast extract or yeast autolysate is produced from a yeast strain belonging to the genera *Saccharomyces, Kluyveromyces, Candida* or *Torula*. In a preferred embodiment the yeast extract or yeast autolysate is produced from a yeast strain belonging to the genus *Saccharomyces*, i.e. *Saccharomyces cerevisiae*.

In a preferred embodiment oil may be added to the composition in step (a) and/or step (b) oil of the process of the invention. The amount of oil in the composition after adding the oil is preferably between 0.1% and 5% w/w, preferably between 0.2% and 2% w/w and more preferably between 0.5% and 1% w/w based on the total weight of the composition. The product of the process of the first aspect of the invention (i.e. the product having a fish flavour, hereafter referred to as "the product") may be in any form. For example, the product may be in dry or in liquid formulation. The product when in a dry formulation may be friable, i.e. it may easily reduce to or give off powder or dust. Dust is generally considered to be hazardous to the health of humans and animals. Adding oil to the composition may render the product less friable and thereby prevents it to give off dust or powder.

In a preferred embodiment the oil is a hydrogenated sunflower oil.

In a preferred embodiment the incubation in step (b) of the first aspect of the invention is carried out in an extruder. The extruder may be any type of extruder suitable for the production of process flavours such as a twin extruder. Extruders, e.g. twin extruders, are known in the art. The composition of the first aspect and optionally water and/or oil may be introduced into the extruder through the same or separate feeders. The product may leave the extruder at a pressure, outside the extruder, varying from reduced pressure (e.g. 5 mbar) to atmospheric pressure (e.g. approximately 1 bar). The extruded product can be further cooled and/or dried using a cooling belt or any other method known in the art. Use of an extruder may result in a stable fish flavour. For example, due to the high temperatures in an extruder (typically higher than 100° C., but more probably higher than 120° C.) a so-called "smelt" may be formed inside the extruder, as a result of which the flavour may leave the extruder in an incapsulated form, also referred to as a glassy state, which may stabilise the product having a fish flavour against, for instance, oxidation. Oxidation may result in a rancid off flavour.

The other ingredients in step (c) of the process may be for example a yeast extract or yeast autolysate, protein hydrolysate, soy sauce, herbs, spices, salts, and any other condiment. The product may be advantageously mixed with other ingredients to dilute the fish flavour, for example when the fish flavour of the product is too strong to be used directly and undiluted in the food, or to make a ready-to-use seasoning.

In a second aspect the invention provides a product having a fish flavour obtainable by the process of the first aspect of the invention. The product of the second aspect of the invention is characterized in that it may have a boiled, grilled, roasted, fried, and/or smoked fish flavour.

In a further aspect the invention provides a seasoning comprising the product having a fish flavour obtainable by the process of the invention. A seasoning is a mixture of food or feed ingredients, usually consisting of herbs and salt, to be added to food or feed to impart or enhance flavour. The seasoning is preferably a food or feed seasoning. Preferably, the amount of the product having a fish flavour of the invention in the seasoning is between 0.5 and 10% w/w, more preferably between 1 and 5% w/w, most preferably between 2 and 4 w/w based on the total weight of the seasoning.

In a further aspect the invention provides food or feed comprising the product having a fish flavour or the seasoning of the invention. Preferably, the amount of product having a fish flavour is between 0.01 and 5% w/w, more preferably between 0.05 and 1% w/w, most preferably between 0.1 and 0.5% w/w based on the total weight of the food or feed.

In a further aspect the invention provides the use of a product having a fish flavour of the invention or the seasoning of the invention to impart or enhance fish flavour in food or feed. The product having a fish flavour of the invention or the seasoning of the invention may advantageously be used in applications where boiled, grilled, roasted, fried, and/or smoked fish flavours are desired, such as potato crips or chips, snacks, fish crackers, fish meat replacers, fermented soy products, soups, oriental food and seasonings for the same. The product having a fish flavour of the invention or the seasoning of the invention may also be used to give more fish flavour and/or a deeper fish flavour to fish meat, for example surimi or sushi. The product having a fish flavour of the invention or the seasoning of the invention is already effective in diluted concentrations and may therefore be used in a cost-effective manner in the application. The product having a fish flavour of the invention or the seasoning of the invention may also be used to flavour feed, such as pet food. The product having a fish flavour of the invention or the seasoning of the invention may be regarded and registered as a natural flavour. The product having a fish flavour of the invention or the seasoning of the invention may be added to the food or feed in the process of preparation (e.g. in the kitchen) or when the food or feed is ready for consumption, e.g. on the table. By varying the amount of the product having a fish flavour or the seasoning of the invention in the food or feed the skilled person may, without undue burden, establish suitable amounts of product having a fish flavour or seasoning in order to enhance or impart a suitable fish flavour. The fish flavour of the invention is preferably added to food or feed in an amount to arrive at a final concentration between 0.01% and 5% w/w, preferably between 0.05 and 1% w/w, more preferably between 0.1 and 0.5% w/w based on the total weight of the food or feed.

EXAMPLES

Example 1

Extrusion Experiment with Compositions Comprising Docosahexaenoic Acid

To a twin-screw extruder, equipped with a dosing unit and injector for water and a dosing unit and injector for oil, compositions according to Table 1 were added using a separate feeder. Ropufa® '10' n-3 INF powder, obtainable from DSM Nutritional Products, Basel, Switserland, is a refined fish oil in the form of beadlets, finely dispersed in a corn-starch-coated matrix of fish gelatin and sucrose, comprising sodium ascorbate and tocopherols, and contains 7% docosahexaenoic acid. It has no perceptible fishy smell. Gistex® LS, obtainable from DSM Food Specialties, Delft, the Netherlands, is a yeast extract. Four different experiments (Examples I-IV) were done as well as one comparative experiment (comp. Example A), see Table 1. The products formed left the extruder in a room under atmospheric pressure and were cooled and dried on a cooling belt equipped with a pressure roll, and subsequently ground and sampled.

TABLE 1

Experimental set up and results

| | Example I | Example IIa | Example IIb | Example III | Example IV | Comp. Example A |
|---|---|---|---|---|---|---|
| Added ingredients (% of total weight) | | | | | | |
| Gistex ® LS | 93 | 93 | 93 | 92 | 89 | 98 |
| Ropufa ® '10' n-3 INF powder | 5 | 5 | 5 | 5 | 8 | 0 |
| Water | 1 | 1 | 1 | 1 | 1 | 1 |

TABLE 1-continued

Experimental set up and results

|  | Example I | Example IIa | Example IIb | Example III | Example IV | Comp. Example A |
|---|---|---|---|---|---|---|
| Hydrogenated sunflower oil | 1 | 1 | 1 | 2 | 2 | 1 |
| Process conditions | | | | | | |
| Incubation time (seconds) | 73 | 80 | 80 | 80 | 85 | 73 |
| Incubation temperature (° C.) | 158 | 140 | 140 | 131 | 126 | 165 |
| Throughput (kg/hour) | 12 | 10 | 10 | 10 | 6 | 12 |
| Results | | | | | | |
| Flavour before incubation | yeast extract | yeast extract | yeast extract | yeast extract | yeast extract | yeast extract |
| Flavour after incubation | roast, weak fish | more roast, fishy | roast, strongly fishy | mild processed fish | white fish | roast, no fish |

The flavour of the products was evaluated by an expert panel by making a 0.5% w/w aqueous solution containing 0.4% NaCl. As can be seen in Table 1, the compositions comprising docosahexaenoic acid resulted in a fish flavour, whilst the composition without docosahexaenoic acid had a basic roasty flavour, but lacking the fish flavour of the invention. It can also be seen that by varying the temperature, residence time, throughput and/or amount of docosahexaenoic acid different fish flavours can be obtained.

The invention claimed is:

1. A process for producing a product having a stable fish flavour in an encapsulated form, the process comprising:
   a) preparing a composition comprising 1-20% w/w water, yeast extract and/or yeast autolysate, and between 0.1% w/w and 10% w/w polyunsaturated fatty acid based on the total weight of the composition;
   b) incubating the composition in an extruder at a temperature between 120° and 160° C. and at a reaction time sufficient for the fish flavour to develop;
   c) extruding the composition through the extruder; and
   d) optionally mixing the product with one or more other ingredients,
   whereby the fish flavour is a roasted flavour.

2. The process according to claim 1 wherein the polyunsaturated fatty acid is an omega-3 polyunsaturated fatty acid.

3. The process according to claim 2 wherein the omega-3 polyunsaturated fatty acid is eicosapentaenoic acid and/or docosahexaenoic acid.

4. The process according to claim 1 wherein the water content of the composition in step (b) is between 1% and 15% w/w based on the total weight of the composition.

5. The process according to claim 1 wherein, in step (a) and/or step (b), oil is added to the composition.

6. The process according to claim 5 wherein the amount of oil in the composition after adding the oil is between 0.1% and 5% w/w based on the total weight of the composition.

7. The process according to claim 5 wherein the oil is a hydrogenated sunflower oil.

8. The process according to claim 1, wherein the amount of the polyunsaturated fatty acid in the composition is between 0.1% w/w and 1% w/w based on the total weight of the composition.

9. The process according to claim 1, wherein said incubated composition is extruded in an encapsulated form, wherein said encapsulated form is stable against oxidation.

10. The process according to claim 1, wherein the composition comprises yeast extract.

11. The process according to claim 1, wherein the composition comprises yeast autolysate.

12. The process according to claim 1, wherein the yeast extract and/or yeast autolysate are produced from a yeast strain belonging to a genus selected from the group consisting of *Saccharomyces, Kluyveromyces, Candida*, and *Torula*.

13. The process according to claim 1, wherein the yeast extract and/or yeast autolysate is produced from *Saccharomyces cerevisiae*.

14. The process according to claim 2, wherein the omega-3 polyunsaturated fatty acid is docosahexaenoic acid.

15. The process according to claim 5, wherein the amount of oil in the composition after adding the oil is between 0.2% and 2% w/w based on the total weight of the composition.

16. The process according to claim 1, wherein the water content of the composition is between 1% and 5% w/w based on the total weight of the composition.

17. The process according to claim 1, wherein the composition is extruded from the extruder at atmospheric pressure.

18. The process according to claim 1, wherein the composition is incubated in the extruder for at least about 73 seconds.

19. The process according to claim 1, wherein the composition is incubated in the extruder for less than about 85 seconds.

* * * * *